United States Patent [19]

Gutmann et al.

[11] Patent Number: 5,306,344
[45] Date of Patent: Apr. 26, 1994

[54] MIXTURE OF PORTLAND CEMENT CONCRETE MATERIALS FOR FREEZE/THAW RESISTANCE

[75] Inventors: Paul F. Gutmann, Northville; James L. Thornley, Milford, both of Mich.

[73] Assignee: Edward C. Levy Company, Detroit, Mich.

[21] Appl. No.: 984,871

[22] Filed: Dec. 2, 1992

[51] Int. Cl.$^5$ .................. C04B 22/00; C04B 24/12; C04B 26/22

[52] U.S. Cl. .................. 106/714; 106/719; 106/724; 106/727; 106/728; 106/790; 106/823; 106/DIG. 1

[58] Field of Search ............ 106/709, 714, 719, 763, 106/764, 767, 724, 819, 823, DIG. 1, 727, 728, 790; 264/DIG. 43

[56] References Cited

U.S. PATENT DOCUMENTS

| | | | |
|---|---|---|---|
| 2,052,586 | 9/1936 | Tucker | 260/129 |
| 2,141,570 | 12/1938 | Mark | 106/27 |
| 2,169,980 | 8/1939 | Scripture | 106/27 |
| 4,249,948 | 2/1981 | Okada et al. | 106/88 |
| 4,318,744 | 3/1982 | Dodson | 106/714 |
| 4,373,956 | 2/1983 | Rosskopf | 106/90 |
| 4,473,405 | 9/1984 | Gerber | 106/90 |
| 4,606,770 | 8/1986 | Gerber | 106/727 |
| 4,689,083 | 8/1987 | Gutmann et al. | 106/88 |
| 4,741,782 | 5/1988 | Styron | 106/709 |
| 4,961,790 | 10/1990 | Smith et al. | 106/819 |
| 5,076,851 | 12/1991 | Skovara et al. | 106/714 |
| 5,120,367 | 6/1992 | Smith et al. | 106/708 |

FOREIGN PATENT DOCUMENTS 5022 of 1824 United Kingdom .

OTHER PUBLICATIONS

ASTM Standard C33-90, "Standard Specification for Concrete Aggregates," Apr. 1990.
ASTM Standard C125-88, "Standard Terminology Relating to Concrete and Concrete Aggregates," Apr. 1988.
ASTM Standard C150-89, "Standard Specification for Portland Cement," Jul. 1989.
ASTM Standard C233-90, "Standard Test Method for Air-Entraining Admixtures for Concrete," Oct. 1990.
ASTM Standard C494-90, "Standard Specification for Chemical Admixtures for Concrete," Aug. 1990.

*Primary Examiner*—Karl Group
*Assistant Examiner*—Paul Marcantoni
*Attorney, Agent, or Firm*—Honigman Miller Schwartz and Cohn

[57] ABSTRACT

The present invention is a specific combination of components having unique properties both in composition and benefits. Such a combination of portland cement type 1, fly ash type C in combination with a specific gradation of blast furnace slag and a specific gradation of fine aggregate in combination with a sodium lignosulfonic acid, sodium nitrate, sodium thiocyanate, triethanolamine, neutralized Vinsol resin and a coconut fatty acid diethanolamine.

4 Claims, No Drawings

MIXTURE OF PORTLAND CEMENT CONCRETE MATERIALS FOR FREEZE/THAW RESISTANCE

BACKGROUND OF THE INVENTION

This invention pertains to a portland cement concrete mixture that provides increased durability in the hardened state of such a mixture within freeze/thaw temperature cycles under conditions of water saturation. The mixture may include concrete materials in combination with cement additive compositions such as water reducing admixtures, air entraining agents and plasticizers.

The development of portland cement dates back to 1824. An early disclosure is contained in British Patent No. 5022, for "An Improvement in the Modes of Producing an Artificial Stone," to Joseph Aspdin. Conventional portland cement is described in the American Society for Testing and Materials ("ASTM") Standard C150-89, "Standard Specification for Portland Cement," which is incorporated herein by reference.

Portland cement may be blended with a variety of coarse aggregates such as crushed limestone or gravel as well as a fine aggregate. The proportions of portland cement and fine aggregate may be varied depending upon the properties and the use of the concrete. Conventional aggregates for use in concrete are described in the requirements of the American Society for Testing and Materials ("ASTM") Standard C33-90, "Standard Specification for Concrete Aggregates," which is incorporated herein by reference.

In the past, coarse aggregates have fallen within the broad range of 2 inches (7.6 cm) to ⅜ inch mesh; the size of the fine aggregate has been in a broad range of about a No. 4 mesh to a No. 200 mesh pursuant to ASTM C-11 standard sieve specification. Coarse aggregates of mineral origin, such as gravel or crushed limestone, have been used. A manufactured aggregate such as slag has also been used.

Portland cement concrete may also incorporate a pozzolanic material such as a man-made type pozzolan such as fly ash, being produced from the burning of coal. Granulated ground slag from the blast furnace slag material from the steel industry has also been used, or silica fume from the silicon and ferosilicon industry. Natural pozzolan which comes from certain pumieties of natural volcanic origin has also been employed. The most widely used pozzolanic material, however, is the type C fly ash derived from the burning of coal in the power plants that provide electricity.

Chemical admixtures have also been incorporated into portland cement concrete. The chemical admixtures used in portland cement concrete have included water reducing admixtures such as calcium lignosulfonate. Concrete containing hydraulic cement and a water soluble derivative of lignin is disclosed in U.S. Pat. No. 2,141,570, to J. G. Mark, for "Concrete and Hydraulic Cement" A cement mix containing waste sulphite liquor is disclosed in U.S. Pat. No. 2,169,980, to E. W. Scripture, for "Cement Mix." Hydroxyalkyl amines, such as triethanolamine, have been incorporated into calcium lignosulfonate as an accelerator to counteract the set retardation caused by the dispersant. An example of a disclosure of an amine salt is contained in U.S. Pat. No. 2,052,586, to G. R. Tucker, for "Amine Salts of Aromatic Sulfonic Acids." Additional information relating to chemical admixtures to be added to portland cement concrete mixtures for various purposes is disclosed in ASTM C494-90, "Standard Specification for Chemical Admixtures for Concrete," which is incorporated herein by reference.

Various other accelerators have been used to offset the retardation of calcium lignosulfonate, ammonium lignosulfonate or sodium lignosulfonate. These accelerators include calcium chloride, nitrite, nitrate, formate and thiocyanate salts of the alkali and alkaline earth metals. U.S. Pat. No. 4,373,956, to Rosskopf, discloses a cement mixture comprising an alkali or alkaline earth or ammonium salt of thiocyanic acid in combination with an alkanolamine. Such a combination of ingredients has been added to a cementitious mix in an effort to increase the rate of hardening of the mix and to increase the compressive strength of the mix after hardening. Furthermore, U.S. Pat. No. 4,473,405, to Gerber, discloses a mixture including a combination of alkali or alkaline earth metal nitrates, alkanolamines and alkali or alkaline earth metal thiocyanates. Other formulations of water reducing admixtures that were manufactured to increase the water reduction and compressive strength of portland cement concrete have been used in the past. Other accelerators used in the past include carbohydrates such as glucose and corn syrup, and gluconates such as gluconic acid and heptogluconic acids.

Air entrainment which forms a system of air bubbles that will remain in the mix after concrete hardening has an important effect upon the durability of concrete in freeze/thaw temperature cycles. The use of a surface active agent or surfactants is generally necessary to obtain satisfactory amounts of air entrainment. A number of chemical agents have been employed to achieve satisfactory amounts of air entraiment. Generally, the chemical agents are organic chemicals that are broadly classified as soaps and detergents. One example of a chemical agent of this type is neutralized Vinsol resin, manufactured by Hercules, Inc. in Wilmington, Del. Vinsol resin is composed of alkali salts of pinewood resin extracts. A test method for materials used as air-entraining admixtures is disclosed in ASTM C233-90, "Standard Test Method for Air-Entraining Admixtures for Concrete," which is incorporated herein by reference.

In the past, a variety of surfactants has been used, both ionic and non-ionic, in a broad class of detergents to obtain the desired degree of air entrainment. In concrete, for example, U.S. Pat. No. 4,249,948, to Okada et al., discloses the use of an alpha-olefin acid salt, which is said to act as an air entraining agent in the portland cement concrete mix in an effort to improve freeze/thaw resistance. U.S. Pat. No. 4,689,083, to Gutmann et al., discloses a portland cement mix containing an air entraining additive consisting essentially of a coconut fatty acid diethanolamine. The coconut fatty acid diethanolamine is produced by reacting an alkyl ester of coconut acid with diethanolamine, whereby air will be entrained in the mix in the amount of 3% to 9% by volume of the mix.

Experience with conventional concrete admixtures' resistance to repetitive freeze/thaw temperature cycles has not been completely satisfactory. Scaling attributable to improper air void systems, pop-outs due to shale and chert particles in both the limestone and gravel fraction of the coarse aggregate, and shale in the gravel and sand fractions of the portland cement concrete have resulted. Problems associated with the phenomena of surface deterioration have not been solved. The need remains for a portland cement concrete mix that would be more durable when subjected to freeze/thaw temperature cycles.

When a mix is harsh and difficult to finish properly, excessive finishing, water spraying and other means are sometimes employed to bring paste to the top,, causing a weak surface. This may contribute to deterioration of the concrete in freeze/thaw conditions. Such weakness can only be corrected through proper mix designs and the use of chemicals and plasticizers, in accordance with the present invention.

SUMMARY OF THE INVENTION

It has now been discovered that portland cement concrete mixtures can attain improved characteristics, i.e., improve durability and alleviate surface disruptions of portland cement concrete. Thus, in accordance with the present invention, a portland cement mix is used in combination with: a slag coarse aggregate of a specific gradation; a fine natural aggregate of a specific gradation; fly ash blended with water; a water reducing, normal setting chemical composition to control the setting characteristics of the mixture; and, a plasticizer to aid in the finishing qualities of the portland cement concrete mixture.

In a more preferred embodiment of the present invention, a cementitious mixture is combined with a blend of additives. The cementitious admixture comprises 50 to 60 parts of portland cement type 1, 5 to 15 parts of fly ash type C, 130 to 150 parts of blast furnace slag aggregate, and 140 to 160 parts of fine aggregate. This is preferably mixed with 22 to 28 parts of water. The blend of additives comprises 20% to 30% sodium lignosulfonate, 15% to 20% sodium nitrate, 2% to 7% sodium thiocyanate, and 1% to 4% triethanolamine. The blend of additives is preferably in about a 50% aqueous solution. The blend of additives is preferably combined with the cementitious mixture at the rate of about 4 to 10 ounces per 100 weight of the above-described cementitious admixture.

In an especially preferred embodiment, a cementitious mixture comprises 55 parts of portland cement type 1; 5 parts of fly ash type C; 140 parts of blast furnace slag aggregate with a maximum top size of ¼", which would have less than about 10% retained on a ¼" mesh, 20% to 55%; able to pass through a ⅜" mesh, and about 0% pass through a No. 4 mesh; and 150 parts of fine aggregate, which would have less than about 15% retained on a No. 8 mesh and about 0% retained on a No. 4 mesh. This is preferably mixed with 25 parts of water. An especially preferred blend of additives comprises about 25% sodium lignosulfonate, about 20% sodium nitrate, about 4% sodium thiocyanate, and about 2% triethanolamine. The blend of admixtures is preferably in a 50% aqueous solution. The blend of additives is most preferably combined with the cementitious admixture at the rate of about 4 ounces per 100 weight of cementitious mixture.

In a preferred embodiment, a blend of additives may comprise sodium lignosulfonic acid in combination with sodium nitrate, sodium thiocyanate, triethanolamine, neutralized Vinsol resin, and a coconut fatty acid diethanolamine. The blend of additives is preferably combined with the cementitious mixture in an amount not to significantly increase the air content of the concrete mixture. Enough water is added to make a workable concrete mixture.

The present invention resulted from an unexpected discovery of an improved concrete mix having increased durability in a freeze/thaw environment. The discovery was made through a series is of laboratory and field tests with specific gradations of coarse and fine aggregate along with specific chemicals. Such tests have led towards improved results with regard to air void spacing systems, water reduction, set control and plasticizing. The mixture of coarse and fine aggregates, fly ash, sodium lignosulfonate, sodium nitrate, sodium thiocyanate, triethanolamine and coconut fatty acid diethanolamine produces a synergistic effect upon the finishing characteristics of the concrete. This contributes to the absence of scaling and pop-outs due to deleterious materials and poor finishing practices.

The present invention provides the advantage of increased workability brought on by the synergistic effect of the chemicals. This aids finishing characteristics by closing the surface more rapidly while not causing detrimental harm to the air void spacing system of the surface. By the use of a combination of accelerators to offset the retarding effect of the water reducing agent sodium lignosulfonate, the concrete obtains uniform setting characteristics throughout the interior and exterior. The usage of accelerators also permit finishing of the concrete slabs in a more uniform manner and avoid drying of the surface. Detrimental effects on the final hardened product under freeze/thaw conditions are therefore minimized or avoided.

DESCRIPTION OF A PREFERRED EMBODIMENT

Type 1 portland cement, having a high content of tricalciumsilicate and conforming with the specifications set forth in ASTM designation C-150 is preferred. A preferred coarse aggregate of blast furnace slag, as defined by ASTM designation C-125, is mixed with the type 1 portland cement mix. The coarse aggregate preferably has a top size of ¼", with no more than 10% material retained on a ¼" mesh, with about 20% to 55% material able to pass through on a ¼" mesh, and about 0% material able to pass through on a No. 4 mesh. Fine aggregate is prepared in accordance with ASTM designation C-33. In a preferred embodiment, the fine aggregate is then combined with the preferred blast furnace slag with no material retained on a No. 4 mesh, and no more than about 15% material is retained on a No. 8 mesh.

Thereafter, the preferred mixture of coarse aggregate, cement, and fine aggregate may be mixed with pure corn syrup, triethanolamine, sodium lignosulfonic acid, along with accelerators sodium nitrate, sodium thiocyanate and triethanolamine. The aforementioned mixture is then preferably further combined with various percentages of type C fly ash and a neutralized Vinsol resin to purposely entrain 6% to 8% of air in the mixture. The preferred percentages of a chemical mixture used in combination with about 550 pounds of type 1 portland cement and about 50 pounds of type C fly ash, are as follows: sodium lignosulfonate 25%; sodium nitrate 20%; sodium thiocyanate 4%; and, triethanolamine 2%. This combination is in an aqueous solution of approximately 50% water to maintain the stability of the solution.

Subsequently, the admixture is blended with a minute dosage (one ounce per cubic yard of 10% solution) of a coconut fatty acid diethanolamine to produce a finishing product. The ingredients of the invention may provide compressive strengths at 28 days of a minimum of 4500 psi, with an air entrainment at time of placement of 7% ±1, a slump of a maximum of 4 inches, and a maximum water/cement ratio of 0.45.

In a more preferred embodiment of the present invention, a cementitious mixture is combined with a blend of additives. The cementitious mixture comprises 50 to 60 parts of portland cement type 1, 5 to 15 parts of fly ash type C, 130 to 150 parts of blast furnace slag aggregate, and 140 to 160 parts of fine aggregate. This is preferably mixed with 22 to 28 parts of water. The blend of additives comprises 20% to 30% sodium lignosulfonate, 15% to 20% sodium nitrate, 2% to 7% sodium thiocyanate, and 1% to 4% triethanolamine. The blend of additives is preferably in about a 50% aqueous solution. The blend of additives is preferably combined with the cementitious mixture at the rate of about 4 to 10 ounces per 100 weight of the above-described cementitious mixture.

In an especially preferred embodiment, a cementitious mixture comprises 55 parts of portland cement type 1; 5 parts of fly ash type C; 140 parts of blast furnace slag aggregate with a maximum top size of ¾", which would have less than about 10% retained on a ½" mesh, 20% to 55% able to pass through a ⅜" mesh, and about 0% pass through a No. 4 mesh; and 150 parts of fine aggregate, which would have less than about 15% retained on a No. 8 mesh and about 0% retained on a No. 4 mesh. This is preferably mixed with 25 parts of water. An especially preferred blend of additives comprises about 25% sodium lignosulfonate, about 20% sodium nitrate, about 4% sodium thiocyanate, and about 2% triethanolamine. The blend of admixtures is preferably in a 50% aqueous solution. The blend of additives is most preferably combined with the cementitious mixture at the rate of about 4 ounces per 100 weight of cementitious admixture.

In a preferred embodiment, a blend of additives may comprise sodium lignosulfonic acid in combination with sodium nitrate, sodium thiocyanate, triethanolamine, neutralized Vinsol resin, and a coconut fatty acid diethanolamine. The blend of additives is preferably combined with the cementitious admixture in an amount not to significantly increase the air content of the concrete mixture. Enough water is added to make a workable concrete mixture.

While the invention has been described with reference to certain preferred embodiments thereof, those skilled in the art will appreciate that various modifications and substitutes can be made without departing from the spirit of the invention. In particular, in the contests of this invention aqueous solutions of components described may have added thereto small amounts of compatible chelating agents of alkaline earth catons such as magnesium or calcium which normally occur in ordinary water but would also tend to precipitate surface active agents. Further, the preferred ingredients could be used in combination with other additives for their intended purpose, e.g., and the use of water reducing admixtures to increase compressive strength or accelerating or retarding admixtures to change the rate of set of the Portland cement concrete mixes. Thus, it is intended that the invention will be limited only by the scope of the claims which follow.

What is claimed:

1. A concrete mix comprising:
(A) a mixture which includes
  (1) a cementitious mixture having the following components by weight percentage of the cementitious mixture
    (a) about 13% to 18% Type I Portland cement,
    (b) about 1% to 5% Type C fly ash,
    (c) about 36% to 43% air-cooled blast furnace slag aggregate having substantially no chert particles or shale particles,
    (d) about 38% to 46% fine aggregate having less than 15% retained on a No. 8 mesh and about 0% retained on a No. 4 mesh, said fine aggregate having substantially no chert particles or shale particles, and
    (e) sufficient water to effect hydraulic setting of the cementitious mixture;
  (2) 4 to 10 ounces of an admixture for every 100 pounds of said cementitious mixture, said admixture having the following components by weight percent of the admixture
    (a) about 20% to 30% sodium lignosulfonate,
    (b) about 15% to 20% sodium nitrate,
    (c) about 2% to 7% sodium thiocyanate,
    (d) about 1% to 4% triethanolamine, and
    (e) about 50% aqueous solution;
  (3) an air entraining admixture of neutralized alkali salts of pinewood resin extracts; and
(B) a finishing enhancer of about one ounce of 10% solution of coconut fatty acid diethanolamine for every cubic yard of said mixture.

2. A concrete mix comprising:
(A) a mixture which includes
  (1) a cementitious mixture having the following components by weight percentage of the cementitious mixture
    (a) about 16% Type I Portland cement,
    (b) about 1% Type C fly ash,
    (c) about 40% air-cooled blast furnace slag aggregate, having substantially no chert particles or shale particles,
    (d) about 43% fine aggregate having less than 15% retained on a No. 8 mesh and about 0% retained on a No. 4 mesh, said fine aggregate having substantially no chert particles or shale particles, and
    (e) sufficient water to effect hydraulic setting of the cementitious mixture;
  (2) about 4 ounces of an admixture for every 100 pounds of said cementitious mixture, said admixture having the following components by weight percent of the admixture
    (a) about 25% sodium lignosulfonate,
    (b) about 18% sodium nitrate,
    (c) about 5% sodium thiocyanate,
    (d) about 2% triethanolamine, and
    (e) about 50% aqueous solution;
  (3) an air entraining admixture of neutralized alkali salts of pinewood resin extracts; and
(B) a finishing enhancer of about one ounce of a 10% solution of coconut fatty acid diethanolamine for every cubic yard of said mixture.

3. A method of forming a concrete mix comprising the steps of:
(A) forming a mixture which includes
  (1) a cementitious mixture having the following components by weight percentage of the cementitious mixture
    (a) about 13% to 18% Type I Portland cement,
    (b) about 1% to 5% Type C fly ash,
    (c) about 36% to 43% air-cooled blast furnace slag aggregate, having substantially no chert particles or shale particles, (d) about 38% to 46% fine aggregate having less than 15% retained on a No. 8 mesh and about 0% retained on a No. 4 mesh, said fine aggregate having substantially no chert particles or shale particles, and
(e) sufficient water to effect hydraulic setting of the cementitious mixture;
(2) about 4 to 10 ounces of an admixture for every 100 pounds of said cementitious mixture, said admixture having the following components by weight percent of the admixture
(a) about 20% to 30% sodium lignosulfonate,
(b) about 15% to 20% sodium nitrate,
(c) about 2% to 7% sodium thiocyanate,
(d) about 1% to 4% triethanolamine, and
(e) about 50% aqueous solution;
(3) an air entraining admixture of neutralized alkali salts of pinewood resin extracts; and
(B) enhancing said formed mixture by blending about one ounce of a 10% solution of coconut fatty acid diethanolamine with every cubic yard of said mixture.
4. A method of forming a concrete mix comprising the steps of:
(A) forming a mixture which includes
(1) a cementitious mixture having the following components by weight percentage of the cementitious mixture
(a) about 16% Type I Portland cement,
(b) about 1% Type C fly ash,
(c) about 40% air-cooled blast furnace slag aggregate, having substantially no chert particles or shale particles,
(d) about 43% fine aggregate having less than 15% retained on a No. 8 mesh and about 0% retained on a No. 4 mesh, said fine aggregate having substantially no chert particles or shale particles, and
(e) sufficient water to effect hydraulic setting of the cementitious mixture;
(2) about 4 ounces of an admixture for every 100 pounds of said cementitious mixture in an aqueous solution, the following components by weight percent of the admixture
(a) about 25% sodium lignosulfonate,
(b) about 18% sodium nitrate,
(c) about 5% sodium thiocyanate,
(d) about 2% triethanolamine, and
(e) about 50% aqueous solution;
(3) an air entraining admixture of neutralized alkali salts of pinewood resin extracts; and
(B) enhancing said formed mixture by blending about one ounce of a 10% solution of coconut fatty acid diethanolamine for every cubic yard of said mixture.

* * * * *